S. W. SHOREY.
Turned Seams for Boots and Shoes.
No. 5,754. Reissued Feb. 3, 1874.
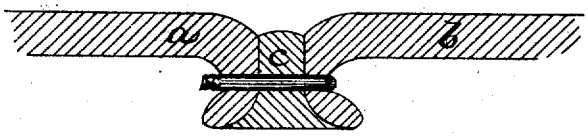
Witnesses.
M. W. Frothingham.
L. H. Latimer
Inventor.
Samuel W. Shorey.
per Crosby & Gould
Attys
AM. PHOTO-LITHOGRAPHIC Co. N.Y. (OSBORNE'S PROCESS.)

UNITED STATES PATENT OFFICE.

SAMUEL W. SHOREY, OF BOSTON, MASSACHUSETTS, ASSIGNOR TO ARZA B. KEITH, TRUSTEE OF THE KEITH WIRE LOCK-STITCH ASSOCIATION.

IMPROVEMENT IN TURNED SEAMS FOR BOOTS AND SHOES.

Specification forming part of Letters Patent No. 137,966, dated April 15, 1873; reissue No. 5,754, dated February 3, 1874; application filed January 17, 1874.

*To all whom it may concern:*

Be it known that I, SAMUEL W. SHOREY, of Boston, in the county of Suffolk and State of Massachusetts, have invented an Improvement in Forming Turned Seams; and I do hereby declare that the following, taken in connection with the drawing which accompanies and forms part of this specification, is a description of my invention sufficient to enable those skilled in the art to practice it.

In the formation of what are known as "turned seams," in making boot-legs, in contradistinction to "lapped seams," the back and front pieces of the leg are laid one upon the other, the two outer faces in contact, and the adjacent outwardly-facing edges are then united by sewing, after which the leg is turned to bring it right side out, and the seam is pressed down to make it flat on the outer side. A welt is usually stitched between the edges, this welt being trimmed at the outer side, to impart a proper finish. These seams, being made with thread, and having to undergo severe strain in the turning, pressing, and finishing operations, are liable to rip, and the thread is apt to rot.

To make a practically indestructible seam of this kind, I first unite the edges by wire or wire fastenings, and then turn the edges upon the wire, pressing them down with force sufficient not only to flatten the seam, but to force the inner edges laterally over the wire, so as to embed, or partially embed, the outer or presented portions thereof, the nature of the seam enabling a much greater pressure to be used than upon seams constructed with thread, so that heavy boots, in which a lapped seam is generally necessary, may be constructed with a turned and welted seam, in which the parts will be more firmly united, and the seam of better shape, than is possible when the thread is used for such a seam.

The drawing represents a section (enlarged) of my improved turned seam.

*a b* denote the two parts to be united; *c*, a welt-strip, which may be placed between the edges. These edges being laid together, they are united by metal fastenings, which may be formed of wire staples, such as are shown in my Patent No. 131,308, which staples may be made and driven with a machine like what is shown in my patent dated February 25, 1873, the points of the staples being twisted together for strength. The parts having been thus united, the leg is drawn over an arm, and the edges are rubbed or hammered down upon the fastenings, the rubbing or hammering operation flattening the seam at both sides of the fastenings.

The invention has been particularly described in connection with side-seaming boot-legs; but it may, of course, be used for the union of any edges which are to be or may be united by a turned seam.

I claim—

A turned seam made by uniting the edges by metal fastenings and turning and pressing the adjacent leather down upon said metal fastenings, substantially as shown and described.

SAMUEL W. SHOREY.

Witnesses:

FRANCIS GOULD,

M. W. FROTHINGHAM.